(12) United States Patent
Igawa

(10) Patent No.: US 9,141,320 B2
(45) Date of Patent: Sep. 22, 2015

(54) PRINT SYSTEM, PRINT PREVIEW DISPLAYING METHOD AND TANGIBLE COMPUTER-READABLE RECORDING MEDIUM

(71) Applicant: Konica Minolta, Inc., Tokyo (JP)

(72) Inventor: Shin Igawa, Tokyo (JP)

(73) Assignee: Konica Minolta, Inc., Tokyo (JP)

( * ) Notice: Subject to any disclaimer, the term of this patent is extended or adjusted under 35 U.S.C. 154(b) by 0 days.

(21) Appl. No.: 14/067,360

(22) Filed: Oct. 30, 2013

(65) Prior Publication Data

US 2014/0132978 A1    May 15, 2014

(30) Foreign Application Priority Data

Nov. 14, 2012  (JP) ................. 2012-250508

(51) Int. Cl.
 *G06F 3/12*  (2006.01)
(52) U.S. Cl.
 CPC ............ *G06F 3/1256* (2013.01); *G06F 3/1207* (2013.01); *G06F 3/1288* (2013.01)
(58) Field of Classification Search
 USPC ....................................................... 358/1.14
 See application file for complete search history.

(56) References Cited

U.S. PATENT DOCUMENTS

| 6,958,824 | B2 | 10/2005 | Whitmarsh | |
| 2006/0184877 | A1* | 8/2006 | Ohashi | 715/517 |
| 2007/0121144 | A1* | 5/2007 | Kato | 358/1.14 |
| 2011/0149332 | A1* | 6/2011 | Cho | 358/1.14 |
| 2011/0293199 | A1 | 12/2011 | Itakura | |
| 2013/0022292 | A1* | 1/2013 | Miyagi | 382/286 |

FOREIGN PATENT DOCUMENTS

| JP | 2001-265555 A | 9/2001 |
| JP | 2002-333961 A | 11/2002 |
| JP | 2005-309795 A | 11/2005 |
| JP | 2006135819 A | 5/2006 |
| JP | 2007-034808 A | 2/2007 |
| JP | 2011254136 A | 12/2011 |

OTHER PUBLICATIONS

Patent Abstracts of Japan, Publication No. 2002-333961, Published on Nov. 22, 2002, 1 page.
Patent Abstracts of Japan, Publication No. 2001-265555, Published on Sep. 28, 2001, 1 page.

(Continued)

*Primary Examiner* — Saeid Ebrahimi Dehkord
*Assistant Examiner* — Lennin Rodriguezgonzale
(74) *Attorney, Agent, or Firm* — Osha Liang LLP

(57) ABSTRACT

Disclosed is a print system including: a client terminal; and a print server to create a print data in accordance with a file received from the client terminal and to transmit the created print data to a printer; and to instruct the client terminal to display a print preview for the file and a print setting UI on a Web browser of the client terminal in a display mode selected from a plurality of display modes, wherein the client terminal determines the display mode and notifies the print server of the determined display mode, and wherein the print server selects the display mode in which the print preview and the print setting UI are displayed on the Web browser of the client terminal, in accordance with a notification relating to the determined display mode from the client terminal.

23 Claims, 14 Drawing Sheets

(56) References Cited

OTHER PUBLICATIONS

Office Action issued in corresponding Japanese Application No. 2012-250508 dated Oct. 14, 2014, and English translation thereof (9 pages).

"Free Software Makes Both XP and Vista "faster"", Nikkei PC Beginners vol. 3, Japan, Nikkei Business Publications, Inc. Mar. 13, 2009 vol. 14 (5 Pages).

Decision of Refusal in corresponding Japanese Application No. 2012-250508 mailed Jun. 3, 2015 (9 pages).

* cited by examiner

| DISPLAY MODE | ANIMATION DISPLAY | PREVIEW |
|---|---|---|
| MODE 1 | VALID | HIGH RESOLUTION PREVIEW |
| MODE 2 | VALID | LOW RESOLUTION PREVIEW |
| MODE 3 | INVALID | HIGH RESOLUTION PREVIEW |
| MODE 4 | INVALID | LOW RESOLUTION PREVIEW |
| MODE 5 | INVALID | WITHOUT PREVIEW |

PRINT SYSTEM, PRINT PREVIEW DISPLAYING METHOD AND TANGIBLE COMPUTER-READABLE RECORDING MEDIUM

BACKGROUND OF THE INVENTION

1. Field of the Invention

The present invention relates to a print system, a print preview displaying method and a tangible computer-readable recording medium, for carrying out printing via a server.

2. Description of Related Art

In case that the printing is carried out by using a remotely-situated printer from a local computer, the following method is used. In the method, a file to be printed is transmitted from the local computer to a Web (World Wide Web) server. Then, the Web server creates the print data corresponding to the file and transmits it to an intended printer to instruct the printer to carry out the printing.

For example, a user starts a Web browser in a terminal which the user operates (local computer), and connects the terminal to a Web print application which is installed in the Web server. The terminal which receives the selection of the file (document) to be printed, from the user through the Web browser, transmits the selected file (document) to the Web server in which the Web print application is operated. The Web server which receives the selected file instructs the terminal which the user operates (local computer) to display a print preview on the Web browser displayed on the display unit, and to display a print setting UI (User Interface). When the print setting is changed by using the print setting UI, the print preview is displayed again according to the changed print setting. When the print instruction is received by the Web browser, the Web server transmits the print job to a designated printer.

That is, after the user selects the document on the Web browser, carries out the print setting and confirms the print contents by the print preview, it is possible to carry out the printing by using the designated printer.

However, in case of the Web print application, there are two problems. One problem is that only the stored files can be displayed as the print preview on the Web browser. Therefore, in case that the user prints data which is opened by the desktop application (application program for preparing, editing and displaying the document, or the like), by using a remotely-situated printer via the server, the user must store the file once and select the stored file in the Web browser.

The other problem is that only a file having a file format which is compatible with the Web print application (for example, a PDF (Portable Document Format) file or an XPS (XML Paper Specification) file) can be displayed as the print preview. In case that the file format of the stored file is not compatible with the Web print application, the user is required to change the file format of the stored file to the file format which is compatible with the Web print application by using a conversion program before the Web print application is used.

As a method for solving the above two problems, there is a method in which a printer driver cooperated with the Web print application (cooperation printer driver) is used (Japanese Patent Application Publications No. 2002-333961 and No. 2001-265555). When the printing is carried out by selecting the "cooperation printer driver" from the desktop application in a normal print process, the cooperation printer driver automatically converts the data which is opened by the desktop application, into the data having the file format which is compatible with the Web print application, transmits the converted data to the Web server in which the Web print application is operated, and connects to the Web print application by starting a default Web browser. Then, the print preview is displayed on the Web browser by the process of the Web print application, and the print setting UI is displayed (Japanese Patent Application Publications No. 2002-333961 and No. 2001-265555). Therefore, it is thought that the above two problems are solved.

However, in the above cooperation printer driver, there are some problems. In one problem, in case that the Web print application is started, the Web server obtains the information of the terminal (client terminal) which the user uses and carries out the process for judging the display mode in accordance with the obtained information. Even in case that the Web print application is started by using the cooperation printer driver, it takes time to obtain the above information and to carries out the above process. Therefore, it takes a long time to display the preview and the print setting UI. For example, the server obtains the specification information of the client terminal, judges a display mode which is the most suitable for the client terminal, such as the image resolution of the print setting UI, ON/OFF of the animation display and the like, in accordance with the obtained information, and starts the Web print application in the judged display mode (instructs the client terminal to display the print preview and the print setting UI in the judged display mode).

Further, there is a disadvantage that the user does not recognize the judged display mode until the Web browser is open and the Web print application is started.

In case that a plurality of Web browsers are installed in the client terminal, the cooperation printer driver opens the Web browser which is set as the default. Therefore, in case that the Web browser is opened, when the opened Web browser is not the Web browser which is intended by the user, the user is required to change the default Web browser and to carry out the operation for the printing again from the beginning. Further, incase that the user can freely change the default Web browser, even when the administrator or the like of the network system intends to fix the Web browser to be used for the Web print application to a specific Web browser, the setting of the default Web browser cannot be controlled by the administrator.

SUMMARY

To achieve at least one of the abovementioned objects, a print system reflecting one aspect of the present invention comprises:

a client terminal; and a print server to create a print data in accordance with a file received from the client terminal and to transmit the created print data to a printer; and to instruct the client terminal to display a print preview for the file and a print setting UI on a Web browser of the client terminal in a display mode selected from a plurality of display modes, wherein the client terminal determines the display mode and notifies the print server of the determined display mode, and wherein the print server selects the display mode in which the print preview and the print setting UI are displayed on the Web browser of the client terminal, in accordance with a notification relating to the determined display mode from the client terminal.

Preferably, the client terminal determines the display mode in accordance with ability of the Web browser to be started.

Preferably, the client terminal comprises a printer driver program, and wherein the printer driver program operates the client terminal so as to convert a data which is opened by an application program, into the file having a format which is compatible with the print server, and to transmit the file to the print server.

Preferably, the client terminal automatically starts the Web browser when printing is carried out by using the print server, and the client terminal receives an operation for changing the Web browser to be started before the Web browser to be started is started.

Preferably, the client terminal notifies a user of the determined display mode before the client terminal notifies the print server of the determined display mode.

Preferably, when an operation for starting printing is received on the Web browser, the print server creates the print data in accordance with a print setting received by the print setting UI.

BRIEF DESCRIPTION OF THE DRAWINGS

The present invention will become more fully understood from the detailed description given hereinafter and the accompanying drawings given by way of illustration only, and thus are not intended as a definition of the limits of the present invention, and wherein:

FIG. 6 is an explanatory view showing an example of the display mode list;

DETAILED DESCRIPTION OF PREFERRED EMBODIMENT

Hereinafter, a preferred embodiment of the present invention will be explained with reference to the accompanying drawings.

Figure 1:
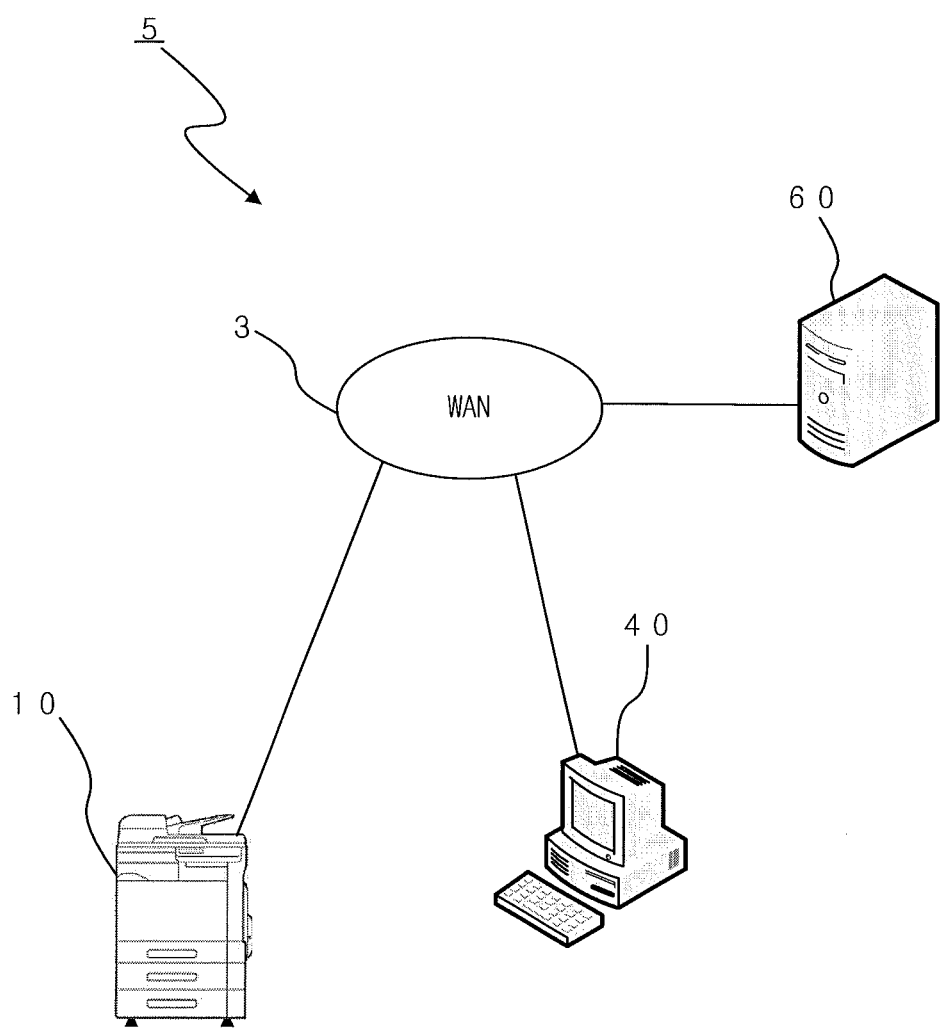
FIG. 1 is an overall view showing a print system according to the embodiment.

FIG. 1 shows the print system 5 according to the embodiment. In the print system 5, an image forming apparatus 10, a client terminal 40 (Personal Computer) and a print server 60 are connected via a network, such as a WAN (Wide Area Network) 3 and the like.

The image forming apparatus 10 is a so-called multi-function peripheral which executes a job, such as a copy job for optically reading an original to print the read image on recording paper, a scan job for obtaining image data by reading an original to store the obtained image data as a file or to transmit the obtained image data to an external terminal, a print job for printing out an image on recording paper in accordance with data received from the print server 60, and the like.

The client terminal 40 is a so-called PC (Personal Computer) terminal comprising a display unit, such as a display, an operating unit, such as a keyboard and a mouse, and the like. The client terminal 40 has a function as a print instruction device which communicates with the print server 60 and transmits a print instruction to the image forming apparatus 10 via the print server 60 in accordance with the user's operation. In the embodiment, in the client terminal 40, a cooperation printer driver which is cooperated with the print server 60 is installed.

The print server 60 operates the Web print application. The Web print application is one for displaying the print setting UI and the print preview on the Web browser displayed on the display unit of the client terminal 40. The print server 60 transmits the data relating to the print setting UI and the print preview to the client terminal 40 while the print server 60 communicates with the client terminal 40, and transmits the print job to the image forming apparatus 10 in accordance with the instruction received from the client terminal 40.

The Web print application has a plurality of display modes (the display mode will be explained in detail later). The data relating to the print setting UI and the print preview is transmitted in the most suitable display mode according to the specification of the client terminal 40 (such as the type of Web browser installed in the client terminal 40, the version information of the Web browser, the processing capability of the client terminal 40, or the like).

In the print system 5 according to the embodiment, the printing can be carried out by three methods which are a print method in which the cooperation printer driver is not used (first print method), a method in which a normal cooperation printer driver (referred to as the first cooperation printer driver 44 (See FIG. 3)) is used (second print method), and a method in which the cooperation printer driver having the main feature of the embodiment (referred to as the second cooperation printer driver 30 (See FIG. 9)) is used (third print method). The third print method is the method for using the print system 5, which has the main feature of the embodiment. Hereinafter, each print method will be explained.

<First Print Method>

In the first print method, firstly, the client terminal 40 opens the Web browser, receives the selection of the file (document) and transmits the selected file (document) to the print server 60 in accordance with the user's operation. The print server 60 which receives the selected file transmits the data relating to the print setting UI and the print preview to the client terminal 40. The client terminal 40 displays the print setting UI and the print preview on the Web browser. Then, when the user changes the setting by using the print setting UI, the client terminal 40 displays the print preview again according to the changed setting. After the user confirms the print contents by the print preview which is displayed again, when the user carries out the operation for starting the printing, the print job is transmitted from the print server 60 to the image forming apparatus 10 to carry out the printing.

In the first print method, when the print server 60 receives the file (when the Web print application is started), the print server 60 obtains the specification information of the client terminal 40. Then, in accordance with the obtained information, the print server 60 judges the display mode which is the most suitable for the client terminal 40. The data relating to the print setting UI and the print preview is transmitted in the judged display mode.

In the second print method and the third print method, the printing is carried out by using the cooperation printer driver from the desktop application 45 (See FIG. 3 and FIG. 9, an application program for preparing, editing and displaying a document or the like) which is opened (activated). The common steps between the second print method and the third print method are explained. Firstly, the operation for starting the printing by using the cooperation printer driver is received by the desktop application 45 (See FIG. 3 and FIG. 9). Next, the cooperation printer driver (the first cooperation printer driver 44 (See FIG. 3) and the second cooperation printer driver 30 (See FIG. 9)) converts the data which is opened by the desktop application 45, into the print file which is compatible with the Web print application, and transmits the converted data to the print server 60. The cooperation printer driver starts the Web browser at the timing of the above transmission.

The Web browser connects to the Web print application which is operated in the print server 60. The Web print application generates the data relating to the print setting UI and the print preview display image, and instructs the client terminal 40 to display them on the Web browser. Then, when the operation for starting the printing is received on the Web browser, the Web print application transmits the print job to the image forming apparatus 10, and the process is ended. Hereinafter, each print method will be explained.

<Second Print Method>

The user selects "the first cooperation printer driver 44 (See FIG. 3)" in the normal print process from the desktop application 45 (See FIG. 3, the application program for preparing, editing and displaying a document or the like) which is open (activated), and carries out the operation for starting the printing. Then, the first cooperation printer driver 44 converts the data which is opened by the desktop application 45, into the print file having the file format which is compatible with the Web print application. Further, the first cooperation printer driver 44 transmits the above print file to the print server 60 and starts the Web browser which is set as the default, to connect to the Web print application.

When the print server 60 receives the print file (when the Web print application is started), the print server 60 obtains the specification information of the client terminal 40. Then, the print server 60 judges the display mode which is the most suitable for the client terminal 40, in accordance with the obtained information and transmits the data relating to the print setting UI and the print preview in the judged display mode.

The client terminal 40 displays the print setting UI and the print preview on the Web browser in accordance with the received data. Then, when the user changes the setting by using the print setting UI, the client terminal 40 displays the print preview again according to the changed setting. After the user confirms the print contents by the print preview which is displayed again, when the user carries out the operation for starting the printing, the print job is transmitted from the print server 60 to the image forming apparatus 10 and the printing is carried out.

In the second print method, the first cooperation printer driver 44 converts the data which is opened by the desktop application 45, into the print file having the format which is compatible with the Web print application. Then, the first cooperation driver 44 transmits the print file to the print server 60 and opens the default Web browser. As compared with the first print method, in the second print method, there are advantages that the file which is not stored can be transmitted and that the file is automatically converted into a print file having the format which is compatible with the Web print application.

<Third Print Method>

Figure 9:
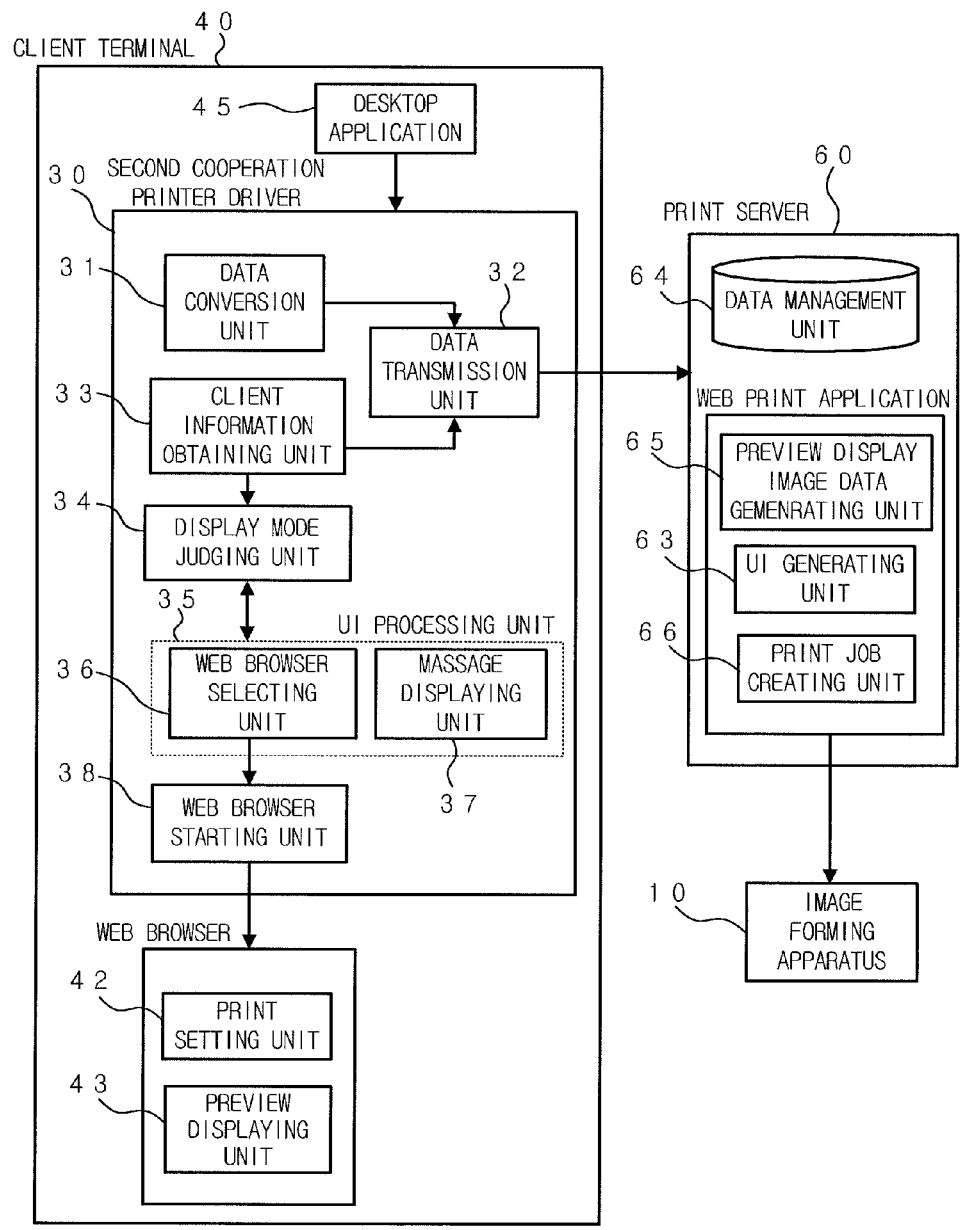
FIG. 9 is a block diagram showing the functional configuration which is necessary to carry out the third print method.

The user selects "the second cooperation printer driver 30 (See FIG. 9)" in the normal print process from the desktop application 45 which is open (activated) (See FIG. 9). The second cooperation printer driver 30 determines the display mode in accordance with the specification of the client terminal 40 and the type of Web browser which is set as the default. In the embodiment, the second cooperation printer driver 30 selects and determines the display mode which has the highest performance among the display modes which can be used in the Web browser set as the default.

The second cooperation printer driver 30 notifies the user of the above selection of the display mode. In case that there is a Web browser which can use the display mode having higher performance than the selected display mode, the second cooperation printer driver 30 notifies the user that such a Web browser is installed in the client terminal 40.

After the user confirms the above notification, the user can change the Web browser to be started, from the Web browser which is set as the default to another browser. When the Web browser is changed, the second cooperation printer driver 30 determines the display mode which has the highest performance among the display modes which can be used in the selected (changed) Web browser, again. Then, the second cooperation printer driver 30 notifies the user of the display mode which is determined again.

When the operation for finally determining the Web browser is received from the user, the second cooperation printer driver 30 converts the data which is opened by the desktop application 45, into the print file having the file format which is compatible with the Web print application. Then, the second cooperation printer driver 30 transmits the print file to the print server 60. Further, the second cooperation printer driver 30 transmits the information (mode information) of the display mode which has the highest performance among the display modes which can be used in the determined Web browser, to the print server 60, and starts the determined Web browser to connect to the Web print application. The print server 60 transmits the information relating to the print setting UI and the print preview to the client terminal 40 in the display mode indicated in the received mode information.

The client terminal 40 displays the print setting UI and the print preview on the Web browser. Then, when the user changes the setting by using the print setting UI, the client terminal 40 displays the print preview again according to the changed setting. After the user confirms the print contents by the print preview which is displayed again, when the user carries out the operation for starting the printing, the print job is transmitted from the print server 60 to the image forming apparatus 10 and the printing is carried out.

As compared with the second print method, in the third print method, because the second cooperation printer driver 30 judges, selects and determines the display mode which is the most suitable for the Web browser to be started, the process task of the print server 60, for judging the display mode can be reduced. The time that elapses until the print setting UI and the print preview are displayed on the Web browser is shortened as compared with the case in which the display mode is not judged by the printer driver (the second print method). Further, even though the setting of the default Web browser is not changed, the user can change the Web browser to the intended Web browser before the second cooperation printer driver 30 starts the Web browser (after the second cooperation printer driver 30 is selected). In addition, the user can confirm the determined display mode before the Web browser is started.

Figure 2:
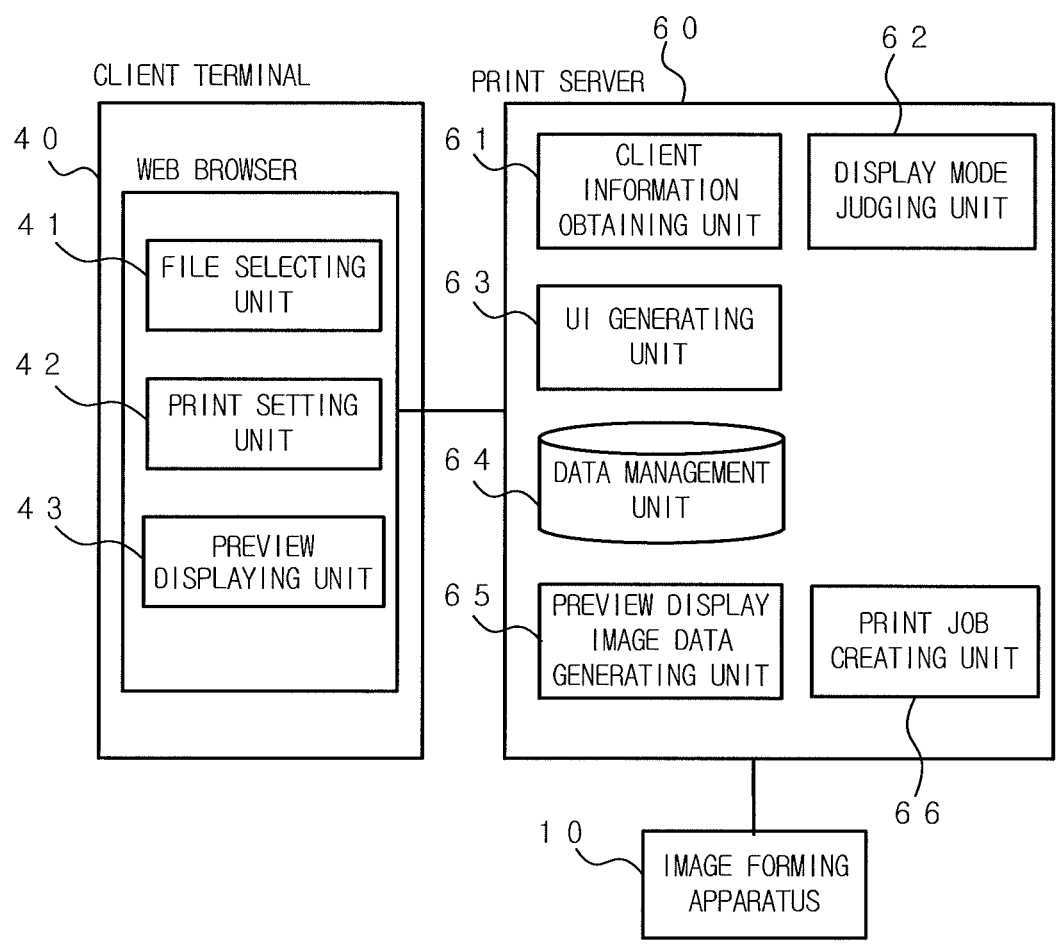
FIG. 2 is a block diagram showing the functional configuration which is necessary to carry out the first print method.

FIG. 2 shows the functional configuration which is necessary to carry out the first print method. The client terminal 40 has the functions as a file selecting unit 41, a print setting unit 42 and a preview displaying unit 43. The print server 60 has the functions as a client information obtaining unit 61, a display mode judging unit 62, a UI generating unit 63, a data management unit 64, a preview display image data generating unit 65 and a print job creating unit 66.

The file selecting unit 41 receives the selection of the document file to be printed, on the Web browser. The selected document file is uploaded (transmitted) to the print server 60 and stored in the data management unit 64.

The print setting unit 42 displays the print setting UI on the Web browser. The print setting values which are changed by the user are notified of the preview displaying unit 43 and the print job creating unit 66 via the data management unit 64.

The preview displaying unit 43 displays the print preview display image data which is generated by the preview display image data generating unit 65, on the Web browser. Further, in order to reflect the result of the print setting on the print preview, the preview displaying unit 43 edits the print preview display image in accordance with the values set by using the print setting unit 42, and displays the print preview.

The client information obtaining unit 61 obtains the specification information and the like of the client terminal 40 (OS (Operating System) used in the client terminal 40, the type of Web browser, the version information of the Web browser, the communication method, and the like) while the client terminal 40 communicates with the print server 60. As a method for obtaining the information, the print server 60 transmits the request to send the necessary information, to the client terminal 40, and receive the response of the request.

The display mode judging unit 62 judges the display mode in accordance with the specification information obtained by the client information obtaining unit 61. In this embodiment, the display mode judging unit 62 judges the display mode in accordance with the type of client terminal 40 and the type of Web browser to be started (including the version information thereof). By previously storing the table in which the display mode which has the highest performance among the available display modes (the most suitable display mode) is assigned according to each type of Web browser and the processing capability of the client terminal 40, and by checking the table with the type of Web browser to be used and the processing capability of the client terminal 40, the display mode judging unit 62 judges the most suitable display mode.

The UI generating unit 63 generates the UIs corresponding to the file selecting unit 41, the preview displaying unit 43 and the print setting unit 42, respectively, according to the display mode judged by the display mode judging unit 62. In the embodiment, the UI corresponding to the preview displaying unit 43 is changed according to the display mode.

The data management unit 64 has a function as a storing unit for storing the uploaded document files, the print file, various types of setting values and the like.

The preview display image data generating unit 65 converts the document file or the print file which is stored in the data management unit 64, into the image data so as to be able to carryout the preview display. The file is converted according to the display mode which is indicated in the judgment result obtained by the display mode judging unit 62. The preview display image data generating unit 65 is the necessary element in the configuration which is used in the second and the third print methods. When the printing is carried out by the third print method, the preview display image data generating unit 65 selects the display mode which is indicated in the notification from the second cooperation printer driver 30 (See FIG. 9) and carries out the above conversion.

The print job creating unit 66 creates a print job to be transmitted to the image forming apparatus 10, in accordance with the document file stored in the data management unit 64, and the values set by using the print setting unit 42.

Figure 3:
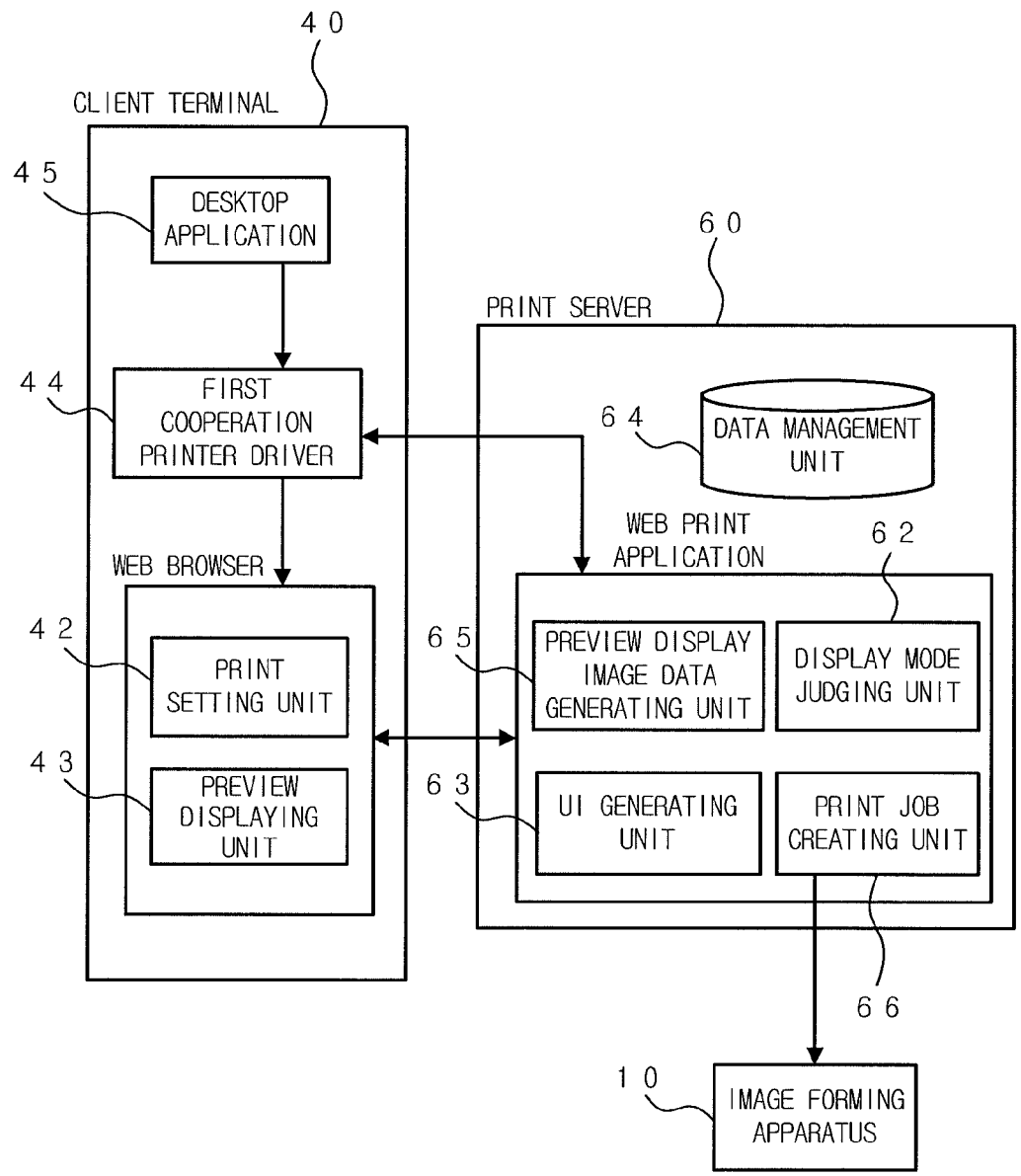
FIG. 3 is a block diagram showing the functional configuration which is necessary to carry out the second print method.

FIG. 3 shows the functional configuration which is necessary to carry out the second print method. The client terminal 40 has the functions as a desktop application 45, a first cooperation printer driver 44, the print setting unit 42, and the preview displaying unit 43. The print server 60 has the functions as the display mode judging unit 62, the UI generating unit 63, the data management unit 64, the preview display image data generating unit 65 and the print job creating unit 66.

The desktop application 45 is an application program for preparing, editing, displaying a document, or the like.

The first cooperation printer driver 44 converts the data which is opened by the desktop application 45, into the print file having the file format which is compatible with the Web print application, and transmits the print file obtained by converting the data to the print server 60. The first cooperation printer driver 44 starts the Web browser which is set as the default, and connects to the Web print application. Further, the first cooperation printer driver 44 transmits the information which is necessary to judge the display mode by the display mode judging unit 62, to the print server 60.

The print setting unit 42, the preview displaying unit 43, the display mode judging unit 62, the UI generating unit 63, the data management unit 64, the preview display image data generating unit 65 and the print job creating unit 66 are the same functional elements as those of the functional configuration which is necessary for the first print method.

Figure 4:
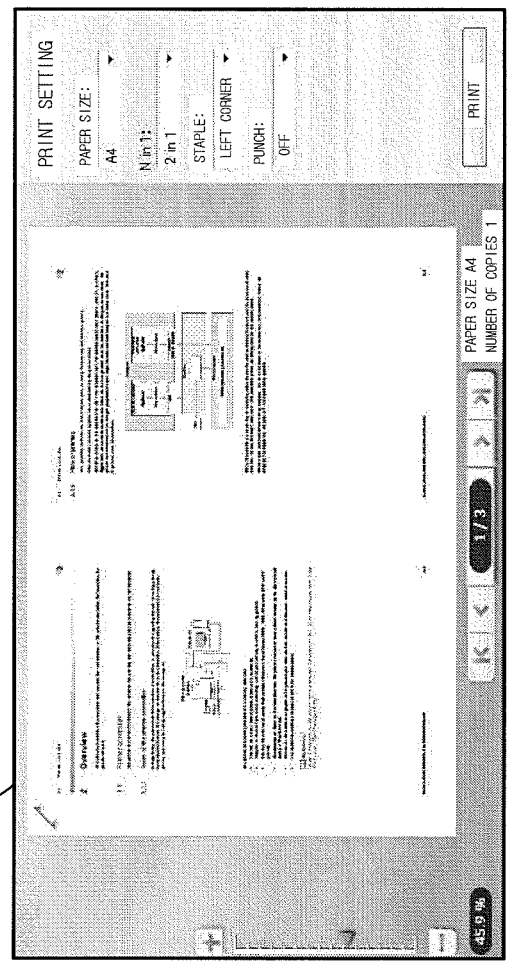
FIG. 4 is an explanatory view showing an example of the Web print application window.

FIG. 4 shows an example of the Web print application window 100 which is displayed by the Web print application on the display unit of the client terminal 40. In the left side area of the window, the print preview is displayed. In the right side area, the print setting UI is displayed. In the Web print application window 100, the preview display which is displayed after "2in1" and "Staple (left corner)" are set by using the print setting UI, is shown.

Figure 5:
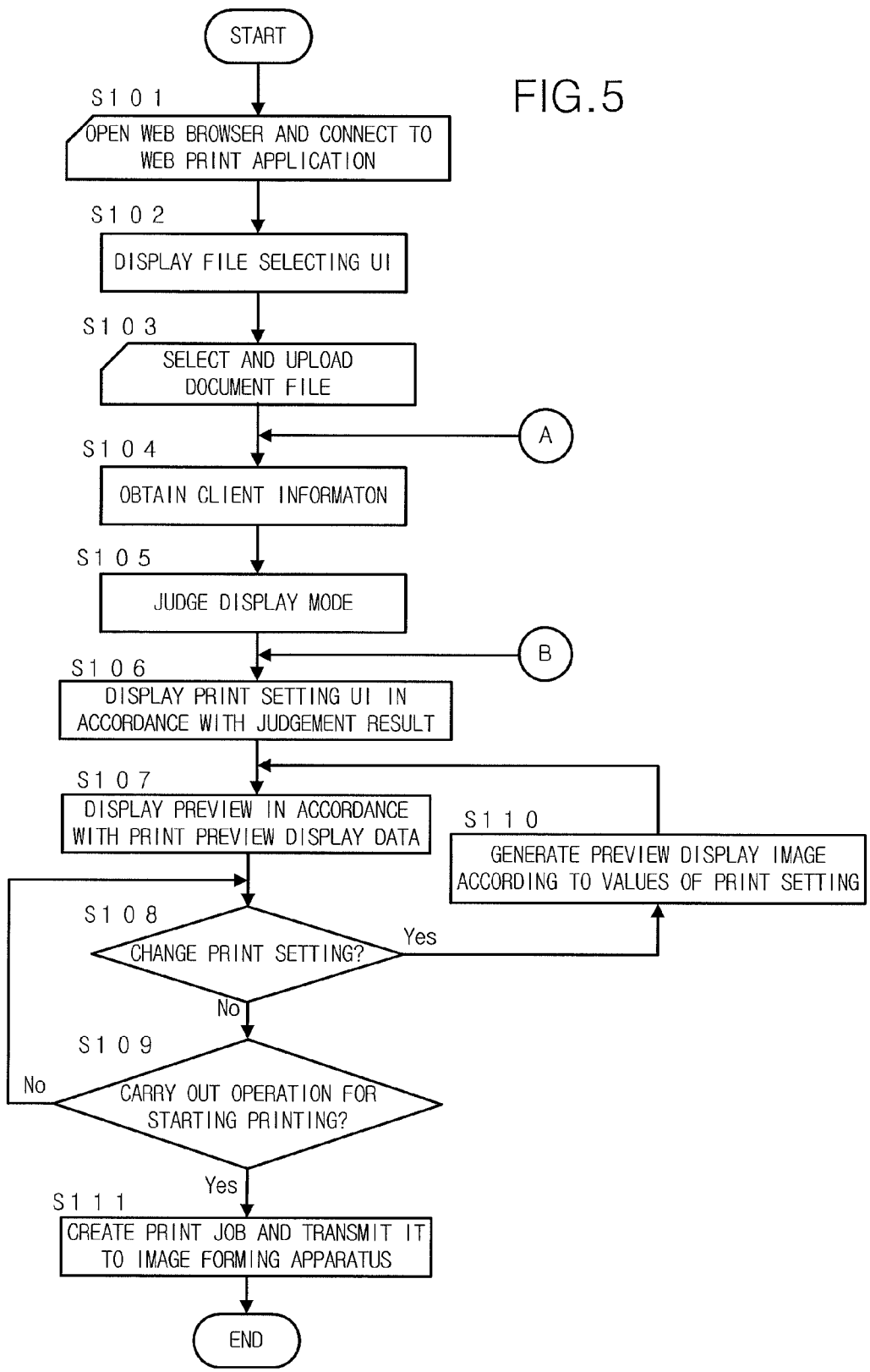
FIG. 5 is a flowchart showing the process in the first print method.

FIG. 5 shows the flowchart of the process in case that the print system 5 carries out the printing by using the first print method. Firstly, the client terminal 40 opens the Web browser and connects to the Web print application of the print server 60 by the user's operation (Step S101). Next, the client terminal 40 displays the file selecting UI on the Web browser (Step S102). When the client terminal 40 receives the selection of the document file, the client terminal 40 uploads the selected document file to the print server 60 (Step S103).

Next, the print server 60 obtains the specification information of the client terminal 40 (Step S104), and judges the display mode in accordance with the specification information (Step S105).

The print server 60 instructs the client terminal 40 to display the print setting UI in the display mode which is indicated in the judgment result obtained in Step S105 (Step S106). Next, the print server 60 converts the uploaded document file into the image data for the preview according to the display mode which is indicated in the judgment result obtained in Step S105, and transmits the image data obtained by the above conversion to the client terminal 40. The client terminal 40 carries out the preview display in accordance with the received image data (Step S107).

When the client terminal 40 receives the operation for changing the print setting from the user (Step S108; Yes), the client terminal 40 generates the preview display image again according to the values of the changed print setting (Step S110). Then, the process returns to Step S107.

In Step S110, the preview displaying unit 43 of the client terminal 40 generates the image again. The print setting UI can change the settings relating to the staple, the 2in1 and the like. Further, with respect to the arrangement of the image, the print setting UI can carry out only simple processes, such as the reduction of the image and the like. Therefore, the client terminal 40 appropriately edits the preview display image in accordance with the image data received from the print server 60, according to the operation for changing the settings from the user. For example, when the instruction for the page ejection is received, the page to be displayed is changed by the application (Java® script or the like) of the client terminal 40. Alternatively, the print server 60 may generate the image data again according to the change of the print setting.

In case that the client terminal 40 does not receive the operation for changing the print setting (Step S108; No), the client terminal 40 judges whether the operation for starting the printing is received (Step S109).

In case that the operation for starting the printing is not received (Step S109; No), the process returns to Step S108. When the operation for starting the printing is received (Step S109; Yes), the print server 60 creates the print job and transmits the print job to the image forming apparatus 10 (Step S111). Then, the process is ended.

Next, the display mode is explained. FIG. 6 shows the display mode list 110 showing an example of the list of the display modes (display modes 1 to 5). In the display mode list 110, the display modes 1 to 5 are listed according to the validity or invalidity of the animation display, the resolution and the like. In case that the Web browser which is opened in the client terminal 40 is compatible with the API (Application Program Interface) used in the animation process, it is judged that the display mode in which the animation display is "valid" can be selected. Further, according to the image resolution and the display processing capability, it is judged whether the display mode in which the image resolution is high can be selected, or it is judged whether the display mode in which the print preview is not displayed (without the preview) is selected. Further, according to the communication speed, it is judged whether the resolution of the print preview display image is high. Then, in accordance with the above judgment result, the display mode which has the highest performance among the selectable display modes (for example, the display mode which has high functionality and high resolution) is judged as the display mode which is the most suitable for the Web browser which is opened in the client terminal 40.

Figure 7:
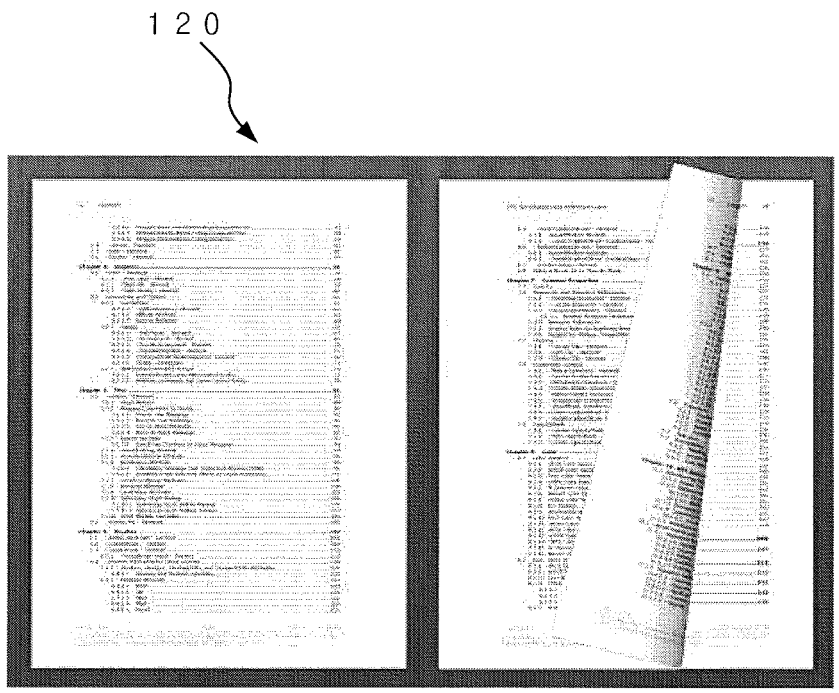
FIG. 7 is an explanatory view showing an example of the animation image.

FIG. 7 shows the animation image 120 which is an example of animation. The animation image 120 shows the animation for the page turning. The type of animation is not limited to the page turning.

Figure 8:
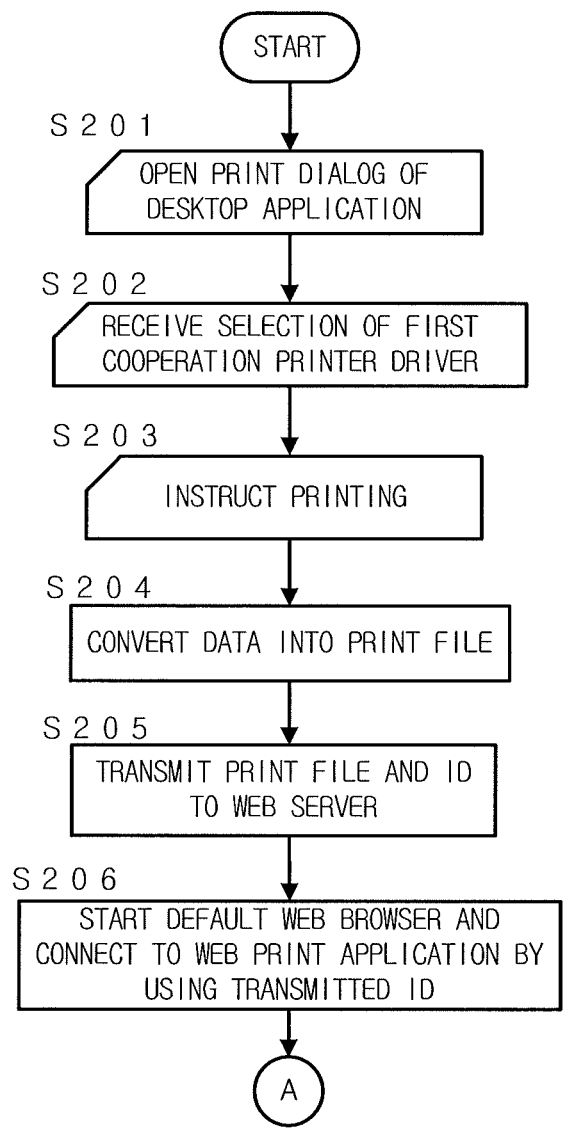
FIG. 8 is a flowchart showing the process in the second print method.

FIG. 8 shows the flowchart of the process in case that the print system 5 carries out the printing by the second print method. Firstly, the client terminal 40 opens the print dialog of the desktop application 45 by the user's operation (Step S201). Next, the client terminal 40 receives the selection of the first cooperation printer driver 44 as the printer driver to be used (Step S202). Then, the client terminal 40 receives the operation for starting the printing (print instruction) (Step S203).

The first cooperation printer driver 44 converts the data which is opened by the desktop application 45 (See FIG. 3), into the print file having the file format which is compatible with the Web print application (Step S204). At this time, the ID (Identification) is added to the print file obtained by the above conversion.

Then, the first cooperation printer driver 44 transmits the print file obtained by the above conversion and the ID of the print file to the print server 60 (Web print application) (Step S205).

The first cooperation printer driver 44 starts the default Web browser of the client terminal 40 and connects to the Web print application by using the ID transmitted to the print server 60 (Step S206). Then, the process proceeds to Step S104 and is continued.

FIG. 9 shows the functional configuration which is necessary for the print system 5 to carry out the printing by the third print method. The client terminal 40 has the functions as the desktop application 45, the second cooperation printer driver 30, the print setting unit 42 and the preview displaying unit 43. The print server 60 has the functions as the UI generating unit 63, the data management unit 64, the preview display image data generating unit 65 and the print job creating unit 66.

The second cooperation printer driver 30 has the functions as a data conversion unit 31, a data transmission unit 32, a client information obtaining unit 33, a display mode judging unit 34, a UI processing unit 35 and a Web browser starting unit 38. The UI processing unit 35 has the functions as a Web browser selecting unit 36 and a message displaying unit 37.

The desktop application 45, the print setting unit 42 and the preview displaying unit 43 of the client terminal 40, and the UI generating unit 63, the data management unit 64, the preview display image data generating unit 65 and the print job creating unit 66 of the print server 60 have the same functions as those of FIG. 3, respectively.

The data conversion unit 31 coverts the data which is opened by the desktop application 45, into the print file having the file format which is compatible with the Web print application which is operated in the print server 60. Then, the data conversion unit 31 assigns the ID (Identification) for identifying the print file to the print file obtained by the above conversion. In this embodiment, the file format of the print file is the PDF (Portable Document Format) or the XPS.

The client information obtaining unit 33 obtains the specification information of the client terminal 40. The client information obtaining unit 33 obtains the information which is necessary to judge the display mode, such as the processing capability, the resolution and the communication speed of the client terminal 40, the information indicating whether the designated Web browser is installed, the information relating to the designated Web browser (version information or the like), and the like.

The display mode judging unit 34 judges the display mode for displaying the Web print application in accordance with the information obtained by the client information obtaining unit 33. As a method for judging the display mode, the method explained in FIG. 6 is used. Firstly, the display mode judging unit 34 judges the display mode which has the highest performance among the available display modes in each of the Web browsers which can be started in the client terminal 40. In this embodiment, after the above judgment, the massage displaying unit 37 notifies the user of the type of Web browser which is previously set as the default and the display mode which has the high performance among the display modes which can be used in the Web browser set as the default.

The data transmission unit 32 transmits the print file obtained by converting the data in the data conversion unit 31, the ID of the print file and the judgment result obtained by the display mode judging unit 34 (display mode information), to the print server 60.

The UI processing unit 35 has the functions as the Web browser selecting unit 36 and the message displaying unit 37. The Web browser selecting unit 36 displays the UI for selecting (changing) the Web browser by the user, on the display unit of the client terminal 40. The user can change the Web browser to be started from the default Web browser to the intended Web browser, by using the UI.

The message displaying unit 37 notifies the user of the type of Web browser set as the default and the display mode which has the highest performance among the display modes which can be used in the default Web browser. Further, in case that by selecting another Web browser, the print setting UI and the print preview can be displayed in the display mode which has higher performance, the message displaying unit 37 notifies the user of the above Web browser as the recommended Web browser. In case that there are a plurality of Web browsers which can use the display mode having higher performance, the Web browser which can use the display mode having the highest performance among the display modes which can be used in a plurality of Web browsers is treated as the recommended Web browser.

After the user confirms the notification of the message displaying unit 37, the user finally determines the Web browser to be started. When the Web browser selecting unit 36 receives the operation for finally determining the Web browser from the user, the data transmission unit 32 transmits the information relating to the display mode having the highest performance, which can be used in the determined Web browser, to the Web print application.

The Web browser starting unit 38 starts the Web browser determined by the Web browser selecting unit 36. Further, the second cooperation printer driver 30 connects to the Web print application by using the ID transmitted by the data transmission unit 32.

Figure 10:
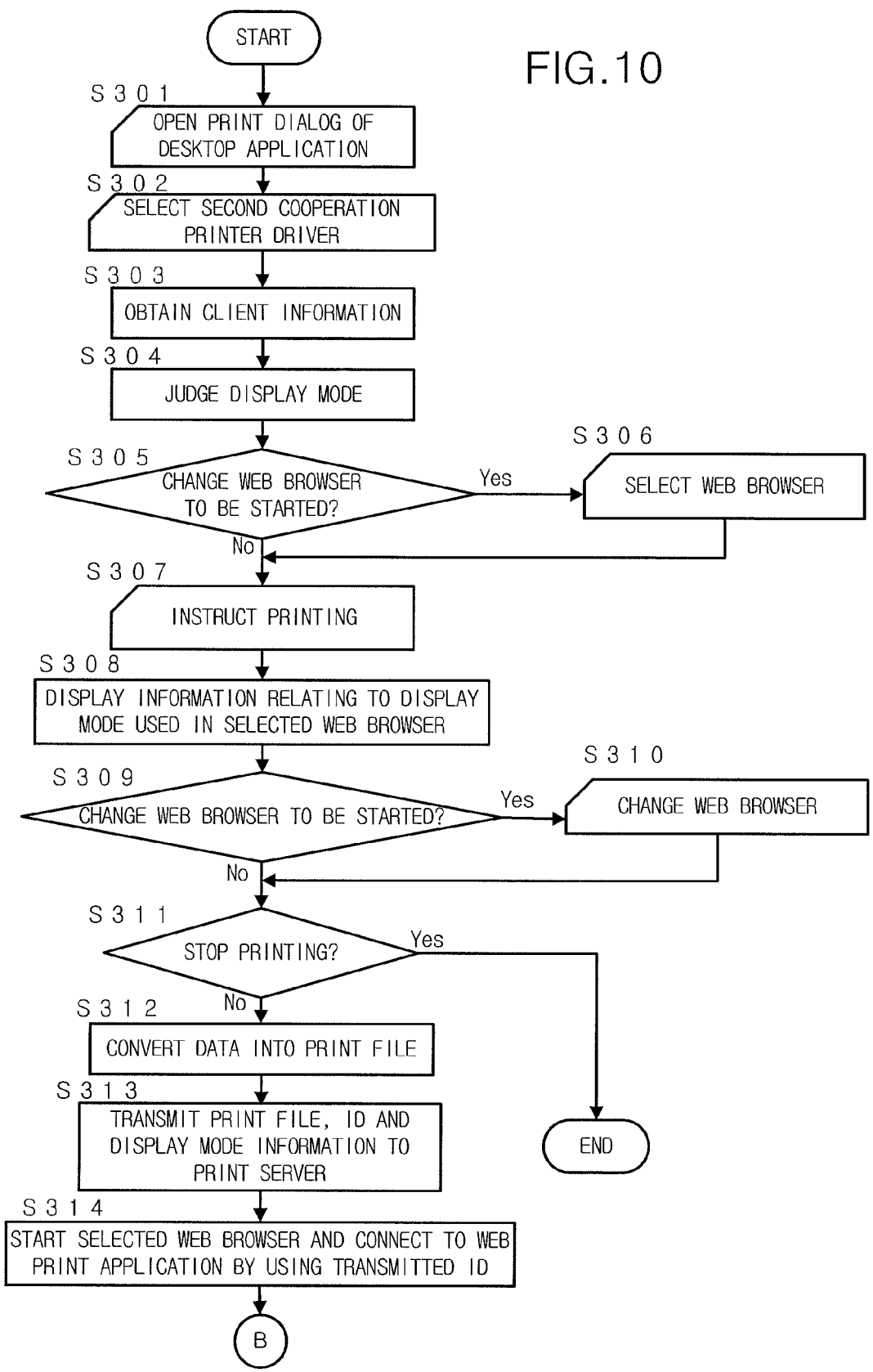
FIG. 10 is a flowchart showing the process in the third print method.

FIG. 10 shows the flowchart of the process in case that the print system 5 carries out the printing by the third print method. In the third print method, the second cooperation printer driver 30 explained in FIG. 9 is used. Firstly, the client terminal 40 opens the print dialog of the desktop application 45 (See FIG. 9) by the user's operation (Step S301).

Next, when the client terminal 40 receives the selection of the second cooperation printer driver 30 as the printer driver to be used (Step S302), the second cooperation printer driver 30 obtains the specification information of the client terminal 40 (Step S303), and judges the display mode (Step S304). In this embodiment, the second cooperation printer driver 30 judges the display mode having the highest performance among the available display modes in each of the Web browsers which can be started in the client terminal 40.

The second cooperation printer driver 30 notifies the user of the type of default Web browser and the display mode having the highest performance among the display modes which can be used in the default Web browser. Then, in case that the operation for changing the Web browser is not received from the user (Step S305; No), the default Web browser is set as the Web browser to be started, and the process proceeds to Step S307. When the operation for changing the Web browser is received (Step S305; Yes), the selection (change) of the Web browser is accepted in the Web browser selecting UI (Step S306). Then, the selected Web browser is set as the Web browser to be started and the process proceeds to Step S307.

In Step S307, the operation for starting the printing is received. In Step S308, the type of Web browser to be started and the display mode information relating to the display mode for displaying the Web print application are displayed on the display unit of the client terminal 40. In case that there is another Web browser which can use the display mode having higher performance than the display mode which is used in the Web browser to be started, the information indicating that the above Web browser which can use the display mode having higher performance is recommended as the recommended Web browser is also displayed.

Then, the user can change the Web browser again. When the operation for changing the Web browser is received from the user (Step S309; Yes), the change of the Web browser to be started is accepted in the Web browser selecting UI (Step S310). The process proceeds to Step S311. In case that the operation for changing the Web browser is not received (Step S309; No), the process proceeds to Step S311. In Step S309 and Step S310, the Web browser to be started is determined.

When the operation for stopping the printing is received (Step S311; Yes), the process is ended. In case that the operation for stopping the printing is not received (Step S311; No), the second cooperation printer driver 30 converts the data which is opened by the desktop application 45, into the print file having the file format which is compatible with the Web print application (Step S312). Further, the ID is assigned to the print file.

Then, the second cooperation printer driver 30 transmits the print file obtained by converting the data in Step S312, the ID assigned to the print file and the display mode information relating to the display mode having the highest performance, which can be used in the Web browser to be started, to the print server 60 (Step S313).

The Web browser starting unit 38 starts the Web browser to be started. Further, the second cooperation printer driver 30 connects to the Web print application by using the ID transmitted in Step S313 (Step S314). The process proceeds to Step S106 in FIG. 5. In Step S106 (See FIG. 5) of the process of the third print method, the print server 60 instructs the client terminal 40 to display the print setting UI and the print preview in the display mode indicated in the notification from the client terminal 40 (display mode indicated in the display mode information transmitted in Step S313).

If the judgment result obtained by judging the display mode in Step S304 is stored once, in the third print method which is carried out from the next time, it is not necessary to carry out the process of Step S304.

Figure 11:
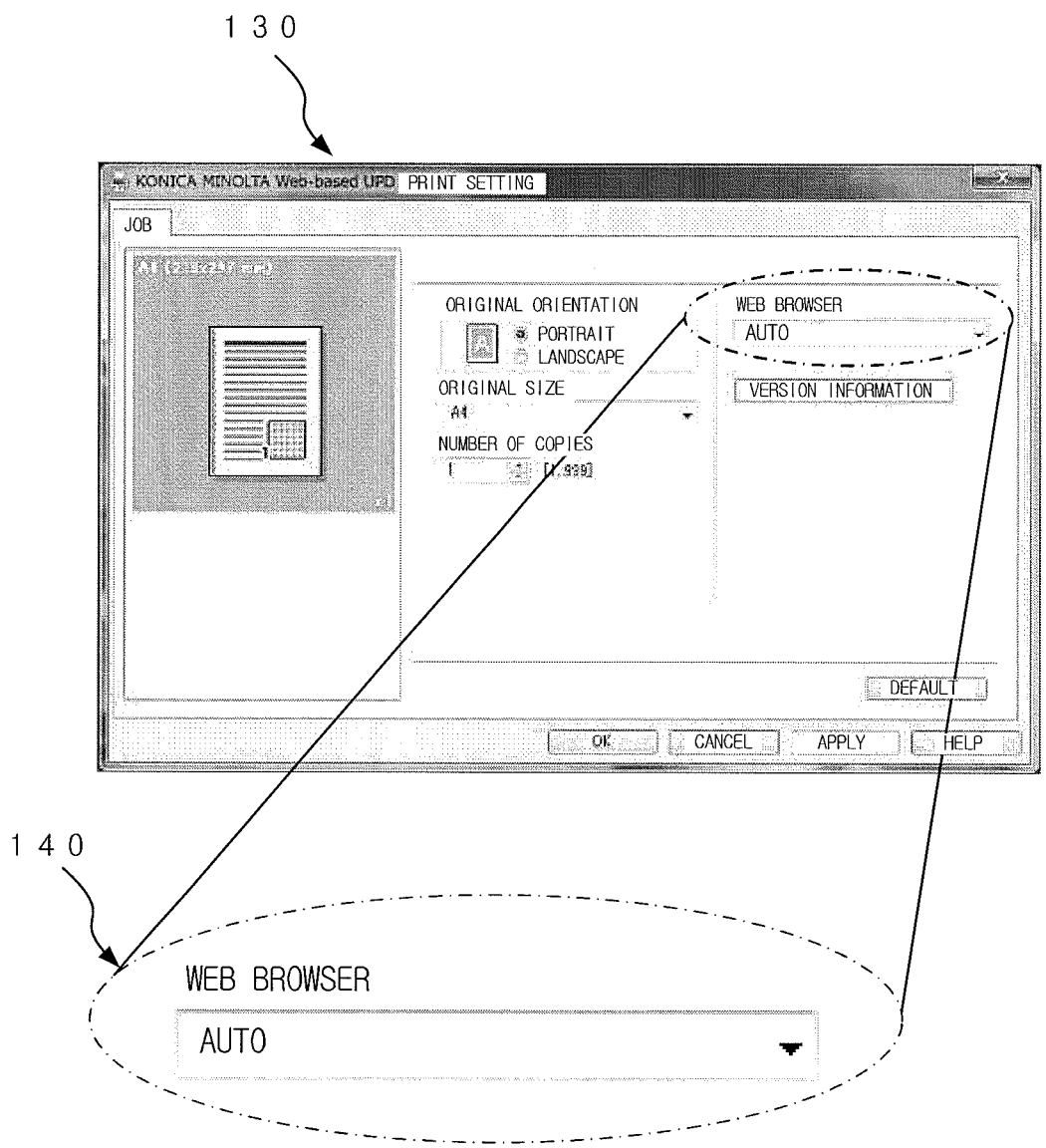
FIG. 11 is an explanatory view showing an example of the detail setting window.

FIG. 11 shows an example of the detail setting window 130 for carrying out the setting of the second cooperation printer driver 30. In the window, the UI (Web browser selecting UI 140) for selecting the Web browser is displayed.

Figure 12:
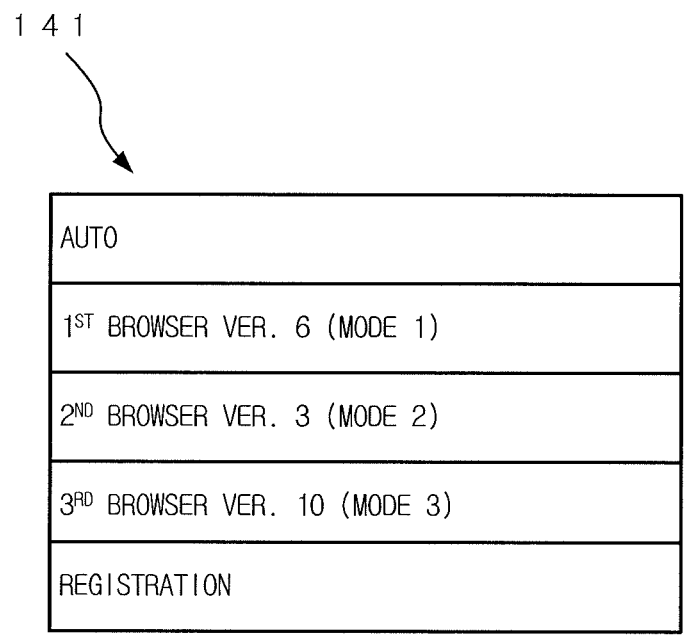
FIG. 12 is an explanatory view showing an example of the Web browser candidate list.

FIG. 12 shows the Web browser candidate list 141 which is a list of the candidates for the Web browser which can be selected in the Web browser selecting UI 140. As the candidates shown in the Web browser candidate list 141, in addition to the item "Auto" for starting the default Web browser, there are three items indicating three types of Web browsers, the first browser, the second browser and the third browser. By selecting the item "Registration" arranged at the bottom of the list, the user can register another Web browser which is not listed as the candidate. On the right side of each Web browser name, the version information of the Web browser and the display mode having the highest performance among the available display modes, are displayed. In case that the Web browser as the candidate is not installed in the client terminal 40, the above Web browser cannot be selected, and in the Web browser candidate list 141, the item indicating the above Web browser is displayed in a grayed out manner.

Figure 13:
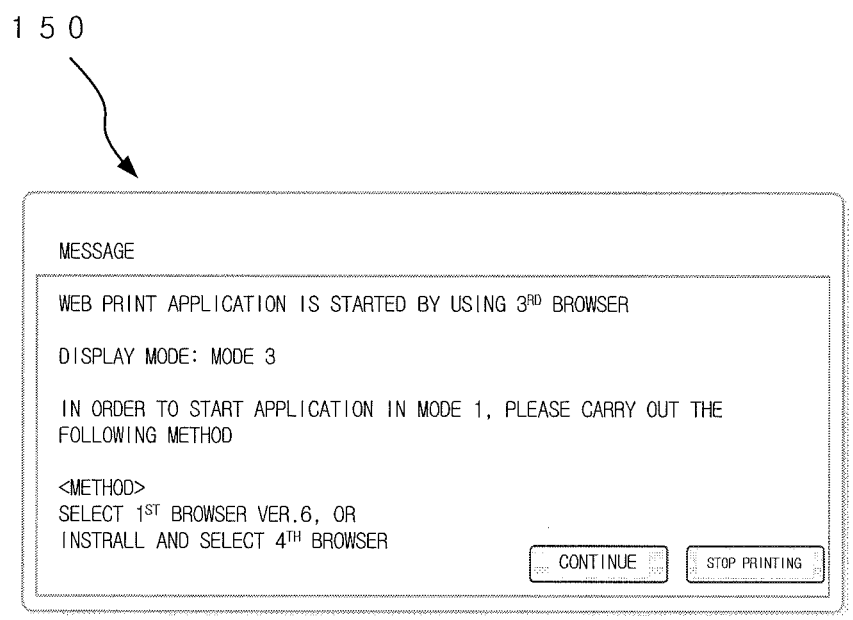
FIG. 13 is an explanatory view showing an example of the message notification.

FIG. 13 shows the message notification 150 which is displayed on the display unit of the client terminal 40 in Step S308 shown in FIG. 10. In the message notification 150, in addition to the type of Web browser to be started and the display mode, the method for using the display mode having the highest performance is displayed. In this embodiment, as the method for using the display mode having the highest performance, the selection of the first browser, and the new installation and the selection of the fourth browser, are displayed.

Figure 14:
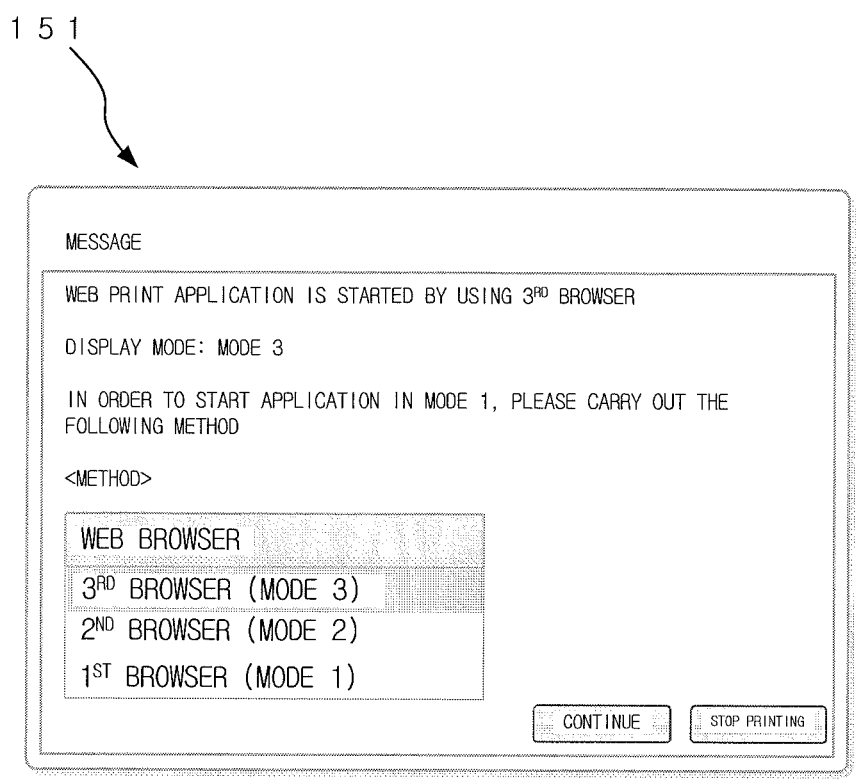
FIG. 14 is an explanatory view showing the message notification in which the Web browser selecting UI is added to the massage notification shown in FIG. 13.

FIG. 14 shows the message notification 151 in which the Web browser selecting UI is added to the message notification 150 shown in FIG. 13. In Step S308 shown in FIG. 10, instead of the message notification 150, the message notification 151 may be displayed. In the message notification 151, the Web browser to be started can be changed to another selectable Web browser.

In the print system 5 according to the embodiment, incase that the printing is carried out by the third print method (in case that the second cooperation printer driver 30 is used), the second cooperation printer driver 30 judges the display mode which is the most suitable for the Web browser to be started. Therefore, the process task of the print server 60, for judging the display mode is eliminated. The waiting time that elapses until the print setting UI and the print preview are displayed on the Web browser is shortened as compared with the case in which the display mode is not judged by the printer driver (the second print method). Further, even though the setting of the default Web browser is not changed, the user can select the Web browser before the second cooperation printer driver 30 starts the Web browser. In addition, the user can confirm the display mode for displaying the Web print application before the Web browser is started.

As described above, the embodiment is explained by using the drawings. However, in the present invention, the concrete configuration is not limited to the above embodiment. In the present invention, various modifications of the above embodiment or the addition of various functions or the like to the embodiment can be carried out without departing from the gist of the invention.

In the embodiment, the image forming apparatus 10 and the print server 60 are provided separately. However, one image forming apparatus 10 having the function as the print server 60 may be provided in the print system 5.

In the embodiment, one image forming apparatus 10 and one client terminal 40 are provided in the print system 5. A plurality of image forming apparatus 10 may be provided in the print system 5. Further, a plurality of client terminals 40 may be provided in the print system 5.

According to the embodiment, in the third print method, the user can freely select the type of Web browser to be started after the request to carry out the printing by using the print server 60 (the operation for selecting the second cooperation printer driver 30) is received. However, the method for selecting the type of Web browser is not limited to this. Further, the administrator may list a plurality of Web browsers as the candidates and the user may select the Web browser from the list. The second cooperation printer driver 30 may automatically select the Web browser which can use the display mode having the highest performance.

In case that the Web browser to be started can use another display mode in addition to the display mode which is indicated in the judgment result, the user may select another display mode which can be used in the Web browser to be started. For example, in case that the display mode which is indicated in the notification from the second cooperation printer driver when the Web browser to be started is determined, is not the display mode which is intended by the user, the user may change the display mode.

One of the objects of the above embodiment is to provide a printer system, a print preview displaying method and a tangible computer-readable recording medium, which can shorten the waiting time that elapses until the print setting UI and the print preview are displayed, as compared with the case in which the display mode is judged by the server.

In the embodiment, the print server has the function to instruct the client terminal to display the print preview and the print setting UI in the display mode which is selected from a plurality of display modes on the Web browser of the client terminal. The client terminal determines the display mode and notifies the print server of the determined display mode. Because the client terminal carries out the process for selecting the display mode, the waiting time that elapses until the print preview and the print setting UI are displayed is shortened, as compared with the case in which the print server carries out the above process for selecting the display mode.

In the embodiment, the client terminal determines the display mode in which the print preview and the print setting UI are displayed, in accordance with the type of Web browser to be started. For example, by judging whether the animation display can be used and/or by judging whether the print preview and the like can be displayed at the high resolution, the client terminal determines the display mode having the highest performance among the available display modes.

In the embodiment, the printer driver program converts the data which is opened by the application program, into the file having the format which is compatible with the print server, and transmits the file to the print server. The above print driver program has the advantages that the file which is not stored can be transmitted and that the data is automatically converted into the file having the format which is compatible with the Web print application.

In the embodiment, even though the Web browser which is set as the default is not changed, it is possible to change the Web browser to be started to another browser after the request to carry out the printing by using the print server is received.

In the embodiment, before the client terminal notifies the print server of the display mode determined by the client terminal, the client terminal notifies the user of the determined display mode. Therefore, the user can recognize the display mode in which the print setting UI and the print preview are displayed, before the print setting UI and the print preview are displayed. For example, in case that the determined display mode is different from the display mode which is intended by the user, it is possible to change the display mode before the print setting UI and the print preview are displayed.

In the embodiment, when the operation for starting the printing is received on the Web browser, the print server creates the print data (print job) in accordance with the print setting received by the print setting UI and transmits the print data to the printer.

According to the printer system, the print preview displaying method and the tangible computer-readable recording medium, it is possible to shorten the waiting time that elapses until the print setting UI and the preview are displayed, as compared with the case in which the display mode is judged by the server.

The present U.S. patent application claims the priority of Japanese Patent Application No. 2012-250508, filed on Nov. 14, 2012, according to the Paris Convention, and the entirety of which is incorporated herein by reference for correction of incorrect translation.

What is claimed is:

1. A print system, comprising:
a client terminal that executes a printer driver and that starts at least one of a plurality of Web browsers comprising a default Web browser and another Web browser that is not the default Web browser when the printer driver is selected for printing; and
a print server that creates a print data based on a file received from the client terminal, transmits the created print data to a printer, and instructs the client terminal to display, on the default Web browser or the another Web browser started by the client terminal, a print preview for the file and a print setting user interface (UI) in a display mode selected from a plurality of display modes comprising a first display mode and a second display mode,
wherein the client terminal displays, during a time period from when the printer driver is selected until when the default Web browser or the another Web browser is started, a window that receives a selection of the default Web browser or the another Web browser,
wherein when the selected Web browser is the another Web browser, the client terminal notifies the print server to determine the first display mode,
wherein when the selected Web browser is the default Web browser, the client terminal notifies the print server to determine the second display mode, and
wherein the print server selects, based on a notification received from the client terminal the first display mode or the second display mode to display the print preview and the print setting UI.

2. The print system of claim 1, wherein the client terminal determines the second display mode based on performance ability of the default Web browser, and the client terminal determines the first display mode based on performance ability of the another Web browser.

3. The print system of claim 1, wherein the printer driver operates the client terminal so that the client terminal converts a data opened by an application program into a file having a format compatible with the print server, and transmits the file to the print server.

4. The print system of claim 1, wherein the client terminal notifies a user of the second display mode via the window.

5. The print system of claim 1, wherein when an operation for starting printing is received on the determined Web browser, the print server creates the print data based on a print setting received by the print setting UI.

6. The printing system of claim 1, wherein the client terminal notifies a user of the second display mode or the first display mode via a window and accepts a change from the default Web browser to the another Web browser via the window.

7. The printing system of claim 1, wherein
the plurality of Web browsers further comprises other Web browsers that are not the default browser, and
the client terminal notifies a user of the first display mode via a window and accepts a change from the default Web browser to one of the other Web browsers via the window.

8. The printing system of claim 1, wherein
the another Web browser supports a display mode with higher performance than the second display mode, and
the client terminal displays the another Web browser on the window and accepts a change from the default Web browser to the another Web browser via the window.

9. The printing system of claim 1, wherein the display modes comprise a first mode in which the print preview is displayed with animation, a second mode in which the print preview is displayed without animation, and a third mode in which the print preview is not displayed.

10. A tangible non-transitory computer-readable recording medium storing a printer driver program to be installed in a client terminal that starts at least one of a plurality of Web browsers comprising a default Web browser and another Web browser that is not the default Web browser when the printer driver program is selected for printing, and wherein the printer driver program causes the client terminal to:
convert data opened by an application program into a file having a format compatible with a print server that:
creates a print data based on the file received from the client terminal and transmits the created print data to a printer, and
instructs the client terminal to display, on the default Web browser or the another Web browser, a print preview for the file and a print setting UI in a display mode selected from a plurality of display modes comprising a first display mode and a second display mode;
display, during a time period from when the printer driver is selected until when the default Web browser or the another Web browser is started, a window that receives a selection of the default Web browser or the another Web browser;
when the selected Web browser is the another Web browser, notify the print server to determine the first display mode, and when the selected Web browser is the default Web browser, notify the print server to determine the second display mode; and
instruct the print server to select, based on the notification received from the client terminal, the first display mode or the second display mode to display the print preview and the print setting UI.

11. The tangible non-transitory computer-readable recording medium of claim 10, wherein the printer driver program causes the client terminal to determine the second display mode based on performance ability of the default Web browser and to determine the first display mode based on performance ability of the another Web browser.

12. The tangible non-transitory computer-readable recording medium of claim 10, wherein the printer driver program causes the client terminal to notify a user of the second display mode via the window.

13. The tangible non-transitory computer-readable recording medium of claim 10, wherein the printer driver program causes the client terminal to:
notify a user of the second display mode or the first display mode via a window; and
accept a change from the default Web browser to the another Web browser via the window.

14. The tangible non-transitory computer-readable recording medium of claim 10, wherein
the plurality of Web browsers further comprises other Web browsers that are not the default browser, and
the printer driver program causes the client terminal to:
notify a user of the first display mode via a window; and
accept a change from the default Web browser to one of the other Web browsers via the window.

15. The tangible non-transitory computer-readable recording medium of claim 10, wherein
the another Web browser supports a display mode with higher performance than the second display mode, and
the printer driver program causes the client terminal to:
display the another Web browser on the window; and
accept a change from the default Web browser to the another Web browser via the window.

16. The tangible non-transitory computer-readable recording medium of claim 10, wherein the display modes comprise a first mode in which the print preview is displayed with animation, a second mode in which the print preview is displayed without animation, and a third mode in which the print preview is not displayed.

17. A print preview displaying method to be carried out by a client terminal that executes a printer driver and that starts at least one of a plurality of Web browsers comprising a default Web browser and another Web browser that is not the default Web browser when the printer driver is selected for printing, the method comprising:
   converting data opened by an application program into a file having a format compatible with a print server that:
      creates a print data based on the file received from the client terminal and transmits the created print data to a printer, and
      instructs the client terminal to display, on the default Web browser or the another Web browser, a print preview for the file and a print setting UI in a display mode selected from a plurality of display modes comprising a first display mode and a second display mode;
   displaying, during a time period from when the printer driver is selected until when the default Web browser or the another Web browser is started, a window that receives a selection of the default Web browser or the another Web browser;
   when the selected Web browser is the another Web browser, notifying the print server to determine the first display mode, and when the selected Web browser is the default Web browser, notifying the print server to determine the second display mode; and
   instructing the print server to select, based on the notification received from the client terminal, the first display mode or the second display mode to display the print preview and the print setting UI.

18. The print preview displaying method of claim 17, wherein the second display mode is determined based on performance ability of the default Web browser, and the first display mode is determined based on performance ability of the another Web browser.

19. The print preview displaying method of claim 17, further comprising: notifying a user of the second display mode via the window.

20. The print preview displaying method of claim 17, further comprising:
   notifying a user of the second display mode or the first display mode via a window; and
   accepting a change from the default Web browser to the another Web browser via the window.

21. The print preview displaying method of claim 17, wherein
   the plurality of Web browsers further comprises other Web browsers that are not the default browser, and
   the print preview displaying method further comprises:
      notifying a user of the first display mode via a window; and
      accepting a change from the default Web browser to one of the other Web browsers via the window.

22. The print preview displaying method of claim 17, wherein
   the another Web browser supports a display mode with higher performance than the second display mode, and
   the print preview displaying method further comprises:
      displaying the another Web browser on the window; and
      accepting a change from the default Web browser to the another Web browser via the window.

23. The print preview displaying method of claim 17, wherein the display modes comprise a first mode in which the print preview is displayed with animation, a second mode in which the print preview is displayed without animation, and a third mode in which the print preview is not displayed.

* * * * *